(12) United States Patent
Hvide et al.

(10) Patent No.: US 12,525,779 B2
(45) Date of Patent: Jan. 13, 2026

(54) CALM BUOY ELECTRICAL TRANSFER SYSTEM

(71) Applicants: Annika Hvide, Piedmont, CA (US); Erik He, Singapore (SG); He Yi Yong, Singapore (SG); Hans Hvide, Singapore (SG)

(72) Inventors: Annika Hvide, Piedmont, CA (US); Erik He, Singapore (SG); He Yi Yong, Singapore (SG); Hans Hvide, Singapore (SG)

( * ) Notice: Subject to any disclaimer, the term of this patent is extended or adjusted under 35 U.S.C. 154(b) by 169 days.

(21) Appl. No.: 18/445,797

(22) Filed: Feb. 6, 2024

(65) Prior Publication Data
US 2025/0253637 A1   Aug. 7, 2025

(51) Int. Cl.
*H02G 9/12* (2006.01)
*B63B 22/02* (2006.01)
*H01B 7/12* (2006.01)
*H01B 7/282* (2006.01)
*H01B 7/40* (2006.01)

(52) U.S. Cl.
CPC .............. *H02G 9/12* (2013.01); *B63B 22/02* (2013.01); *H01B 7/12* (2013.01); *H01B 7/2825* (2013.01); *H01B 7/40* (2013.01)

(58) Field of Classification Search
CPC .......... H02G 9/12; H01B 7/12; H01B 7/2825; H01B 7/40; B63B 22/02
See application file for complete search history.

(56) References Cited

U.S. PATENT DOCUMENTS

| | | | |
|---|---|---|---|
| 4,192,351 A | 3/1980 | Henry | |
| 6,415,828 B1 * | 7/2002 | Duggal | B63B 22/021 141/382 |
| 6,434,948 B1 | 8/2002 | Eide | |
| 6,456,197 B1 * | 9/2002 | Lauritsen | G01N 33/1833 73/451 |
| 8,579,547 B2 | 11/2013 | Pollack | |
| 9,919,774 B2 | 3/2018 | Cook | |
| 2003/0226487 A1 | 12/2003 | Boatman | |
| 2004/0025772 A1 | 2/2004 | Boatman | |
| 2006/0000615 A1 | 1/2006 | Choi | |
| 2006/0010911 A1 | 1/2006 | Hubbard | |
| 2007/0074786 A1 | 4/2007 | Adkins | |
| 2009/0126616 A1 | 5/2009 | Srinivasan | |
| 2014/0166156 A1 | 6/2014 | Dicke-Kuenitz | |
| 2015/0075216 A1 | 3/2015 | Van Wijngaarden | |
| 2016/0236756 A1 | 8/2016 | Van Den Haak | |
| 2021/0171159 A1 * | 6/2021 | Duensing | B63B 22/026 |
| 2022/0001963 A1 | 1/2022 | Duggal | |
| 2023/0399078 A1 * | 12/2023 | Smith | B63B 27/30 |

* cited by examiner

*Primary Examiner* — Timothy J Thompson
*Assistant Examiner* — Amol H Patel
(74) *Attorney, Agent, or Firm* — Randal D. Homburg

(57) ABSTRACT

A high-voltage electrical power supply line for the provides a secure and water-proof connection transfer of high-voltage electricity through an inner high-voltage electrical cable between a single point mooring (SPM) buoy and/or a caternary anchor leg mooring (CALM) buoy and an LNG vessel moored to the SPM CALM buoy, with a secured connection on each end of the high-voltage electrical cable, disallowing and prevent current flow through high-voltage electrical cable until a secure and confirmed connection is established between connectors attaching the high-voltage electrical power supply line to the SPM CALM buoy and the LNG vessel.

11 Claims, 8 Drawing Sheets

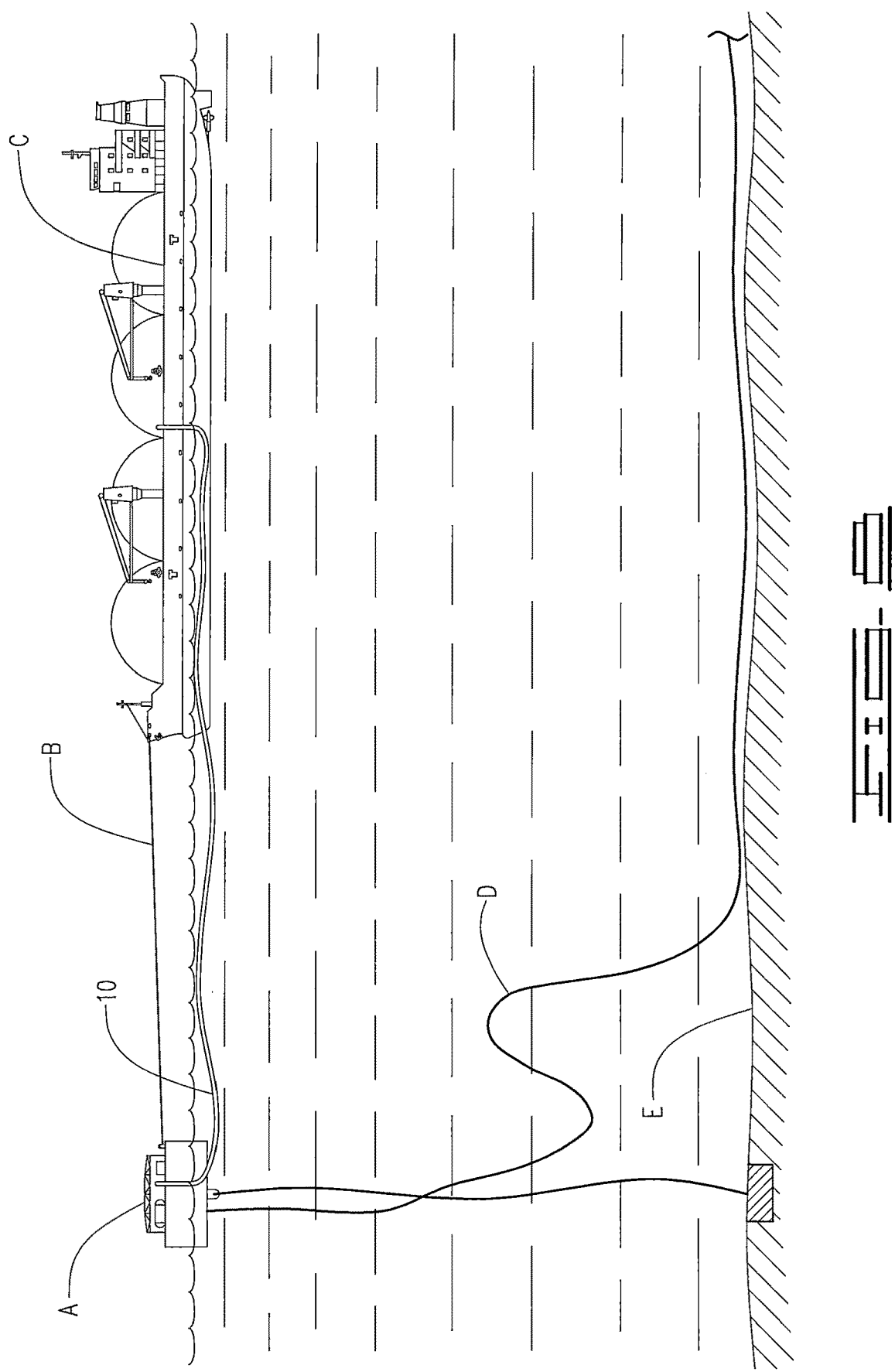

CALM BUOY ELECTRICAL TRANSFER SYSTEM

CROSS REFERENCE TO RELATED APPLICATIONS

None.

BACKGROUND OF THE INVENTION

1. Field of Invention

A high voltage electrical transfer cable attaching an LNG vessel to a CALM buoy electrical supply source provides a high voltage electrical supply line within a floating flexible hose having sufficient floatation to carry the weight of the high voltage electrical cable supply line on the surface of the water between the CALM buoy and the LNG vessel or alternatively threaded through and contained within a series of hinged connected floating pontoons to which the LNG vessel is moored.

2. Description of Prior Art

A preliminary review of prior art patents was conducted by the applicant which reveal prior art patents in a similar field or having similar use. However, the prior art inventions do not disclose the same or similar elements as the present electrical transfer system for an LNG vessel and a CALM buoy supply system, nor do they present the material components in a manner contemplated or anticipated in the prior art.

In U.S. Pat. No. 4,192,351 to Henry, a hose is disclosed for the transport of oil from a vessel to mainland, the vessel being connected to a single point mooring system or a CALM (Caternary Anchor Leg Mooring) system, which allows this type of moored tanker to swing freely under the influence of tide and wind without oil flow through the hose being interrupted. This hose provides either a constant increased stiffness or variable flexibility along the length of the hose or indeed any desired level of stiffness at any position along its length, as opposed to previous hoses that can bind or kink, causing a cessation of flow or hose rupture. It accomplishes this by layer hose construction. It mentions an ability to float by including floatation materials in the hose before curing or being fitted with spaced buoyancy materials.

Three U.S. Patent Application Publication Nos. 2022/0001963 to Duggal, 2004/0025772 to Boatman, and 2003/0226487 to Boatman, disclose a mooring yoke suspended from a frame over the water connecting an LNG carrier vessel to a permanently moored LNG liquification process vessel to provide a transfer of LNG between the vessels. Two U.S. Patent Application Publication Nos. 2007/0074786 to Adkins and 2006/0000615 to Choi discloses fluid transfer hoses which provide for the flow of LNG between either two tethered vessels (Adkins), which provide transfer between a transfer vessel and a processing vessel, or subsea well and a processing vessel (Choi) which liquefies the natural gas from the well and transports the processed LNG to an onshore terminal.

None of the above prior art discloses a floating hose for the transfer of electrical current between a CALM or single point mooring system (SPM) for an offshore LNG transport or processing vessel with safety features at connecting ends to disallow and prevent current flow until the hose and inner high-voltage electrical cable establish a secure connection in the manner and using the elements contained in the specification and claims in the manner claimed and as disclosed below.

SUMMARY OF THE INVENTION

Floating hoses are standard products for the oil and gas industry in ocean bound transport vessels to connect between land and ocean-based ships or barges and terminals as supply lines for liquid contents, for fresh water and waste disposal and where a static supply of fuel is unavailable. It is also common for ship-to-ship transfer and for tethered connections between processing vessels and transfer vessels in the LNG industry.

What is not present is the availability of a water surface safety electrical supply line for high voltage transfer from jetty to vessel or from a CALM buoy to a LNG vessel for long-term or short term connection of electrical power supply for an LNG vessel to continuously process its LNG product while tethered to a CALM buoy or to supply multiple vessels with a single source electrical supply from a CALM buoy or other common harbor or shore power on land through an explosion proof junction box. The explosion proof junction box, having at least one safety sensor, will automatically depower the electrical cables upon opening of the junction box or in appropriate connection to the junction box, by mean of a connection sensor on the terminal end and supply connection to the vessel to ensure a safe and secure connection to each end in order to provide flow through current and voltage to the LNG vessel from junction box to vessel connection.

Two embodiments are contemplated within the scope of the invention. A first embodiment provides the high voltage electrical cable within a floating hose, which orients the electric cable lying passively at the bottom of the inside diameter hose carcass of the floating hose. At each end of the floating hose, there will be an electric cable penetration piece or seal to prevent water ingress into the floating hose when not connected. The hose will be disconnectedly attached to the LNG vessel at the bow or elsewhere along the LNG vessel in an explosion-proof junction box to one or more installed explosion-proof electrical gland connectors as well as the one or more explosion-proof electric glands installed within the junction box location at the supply end of the SPM CALM buoy. There will be an integrated system to prevent accidental disconnection of the cable when there is current flow. Control lines running through the electrical cable will send an emergency cut-off signal when a disconnection is sensed, automatically depowering the electric cable at either or both ends within the respective explosion-proof junction boxes.

The second embodiment provides a plurality of hinge-connected buoyant pontoons which encase the high-voltage cable power supply or alternatively on top of the pontoons in a linear cable tray, to supply each vessel with a continuous electrical power supply to process and maintain its liquid natural gas contents while anchored and secured to the hinge-connected buoyant segments.

The purpose of this electrical cable connection system is to avoid use of vessel power plants having to be engaged to power the hotel load and process boil-off gas into liquid natural gas on the vessel while docked or anchored and instead use more efficient electrical supply from a shore power plant or CALM buoy for as long as the LNG vessel remains stationary, which could be perpetual, with a lightly manned crew, instead of the crew required to maintain power generating machinery during movement or transport.

DESCRIPTION OF THE DRAWINGS

The following drawings are submitted with this utility patent application.

FIG. 6 is an example of several high-voltage power supply cables secured within an explosion-proof junction box.

FIG. 8 is a side view of an LNG vessel tethered to a CALM buoy and also showing the first embodiment high-voltage electrical supply cable attached between the CALM buoy and the LNG vessel in a Lazy S configuration wherein the buoy electrical supply cable entering below the SPM CALM buoy attaches to a land based electrical supply source.

DESCRIPTION OF THE PREFERRED EMBODIMENT

Figure 1:
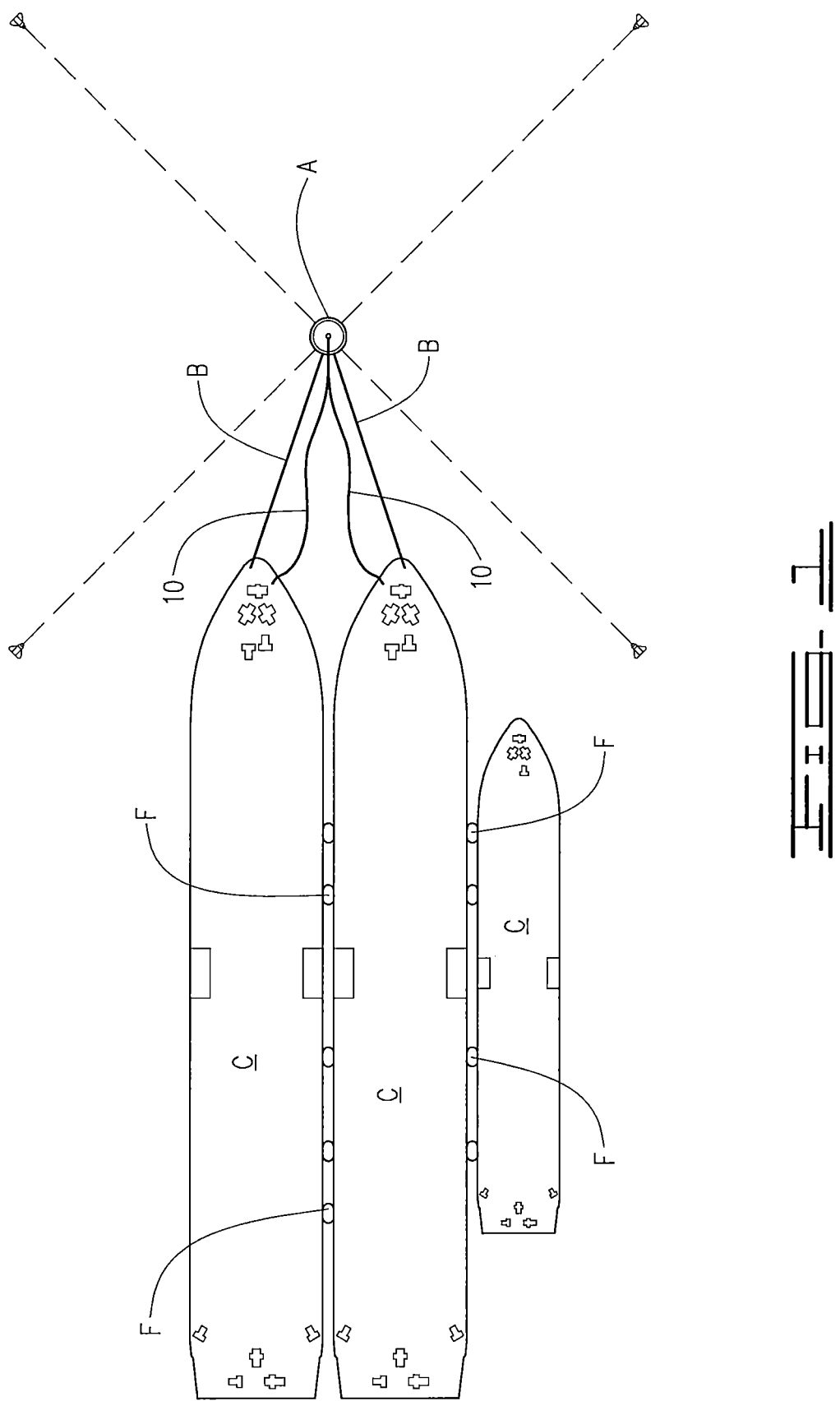
FIG. 1 is a top view of a first embodiment CALM buoy tethering one or more LNG vessel and connecting one or more long-term or short-term connections of a high-voltage electrical supply cable to each LNG vessel to continuously provide the hotel load and to reliquify its boil off gas while anchored and tethered to the CALM buoy.

In the field of ocean vessel transport of LNG, a single point mooring (SPM) system is commonly used by LNG transport and processing vessels for mooring the LNG vessel during processing and transfer of LNG from the vessel to shore or from one vessel to another. There is evident prior art in the SPM systems involving liquid transfer via an SPM CALM (Caternary Anchor Leg Mooring) buoy A system. There is also prior art in turret mooring systems for FSPOs and FSOs that involve fluid transfer through swivels as well as electric power through electrical power swivels. However, there does not appear in the prior art any SPM CALM buoy transfer of only high-voltage electrical power through a floating electrical cable connection to an LNG vessel sufficient to allow an LNG vessel to process LNG on board the vessel involving reliquification of the boil-off gas as well as electricity to supply power to the other vessel functions while allowing the LNG vessel to leave the installation. The LNG vessel C is commonly moored to the SPM CALM buoy A using one or more synthetic fiber mooring ropes B and also allow for multiple vessels to be moored around a single SPM CALM buoy A, FIG. 1. In the present state of art, the CALM buoys A have received their electrical supply source empowerment from a land based supply source buoy cable D running upon the sea floor E and then upward to connect to the SPM CALM buoy A, demonstrated by a loose "Lazy S" configuration of FIG. 8. The buoy's electrical supply may also be obtained through a "Steep S" cable obtaining its electrical power supply through a sea floor E connection below and proximal to the buoy, not shown, but known in the art of ocean power supplies to stationary floating devise and platforms. The independent spaced and multiple mooring potential is not provided for in turret mooring, which are largely immovable and generally cannot be separated from the harbor or supply installation.

For purposes of this specification, "high voltage" is defined as electrical supply of 1-16 MW of electrical power with a voltage between 3 kV and 33 kV, with 400 volts or less being impractical to transfer enough power over the distance contemplated through the SPM CALM buoy to LNG vessel electrical connection due to voltage drop over such distance through the electrical cable connection.

The high-voltage electrical power supply line 10 is provided in a first embodiment involving a floating hose 11 containing one or more shielded high-voltage electrical cables 20 with an inner control wire 25 to monitor the secure supply of electricity between an explosion proof supply end junction box connection 30 of the high-voltage electrical supply line 10 and the vessel electrical end connection 32 of the high-voltage electrical supply line 10 which senses and prevents current flow if there is an insecure connection at either end. The junction box 30 does not necessarily need to be explosion proof where located in an area which is determined to be non-hazardous. Preferably, the connection to the LNG vessel C at the bow, but it can be adapted to connection at either midship or at the stern, depending on the availability and design of the LNG vessel C.

The high-voltage electrical power supply line 10 including the floating hose 11 may also be supplied through a series of hingedly connected pontoons 62 forming a floating jetty 60 in a second embodiment, having a respective centrally aligned bore 66 through which the high-voltage electrical supply line 10 (or alternatively a non-floating hose since each pontoon 62 floats independently and collectively) to which the LNG vessel C may be moored and electrically connected to the SPM CALM buoy A at one or more electrical connections. This floating jetty 60 may provide one or more connections or one or more short flexible electrical cable connections, not shown. A lateral tunnel thruster 70 may be included in a terminal pontoon 63 of the floating jetty 60, or the last or aftermost pontoon, to maintain alignment and position of the floating jetty 60 against the moored LNG vessel C, FIGS. 2 and 4, and also stabilize the LNG vessel C moored to the floating jetty 60 against wave and current flows.

Figure 7:
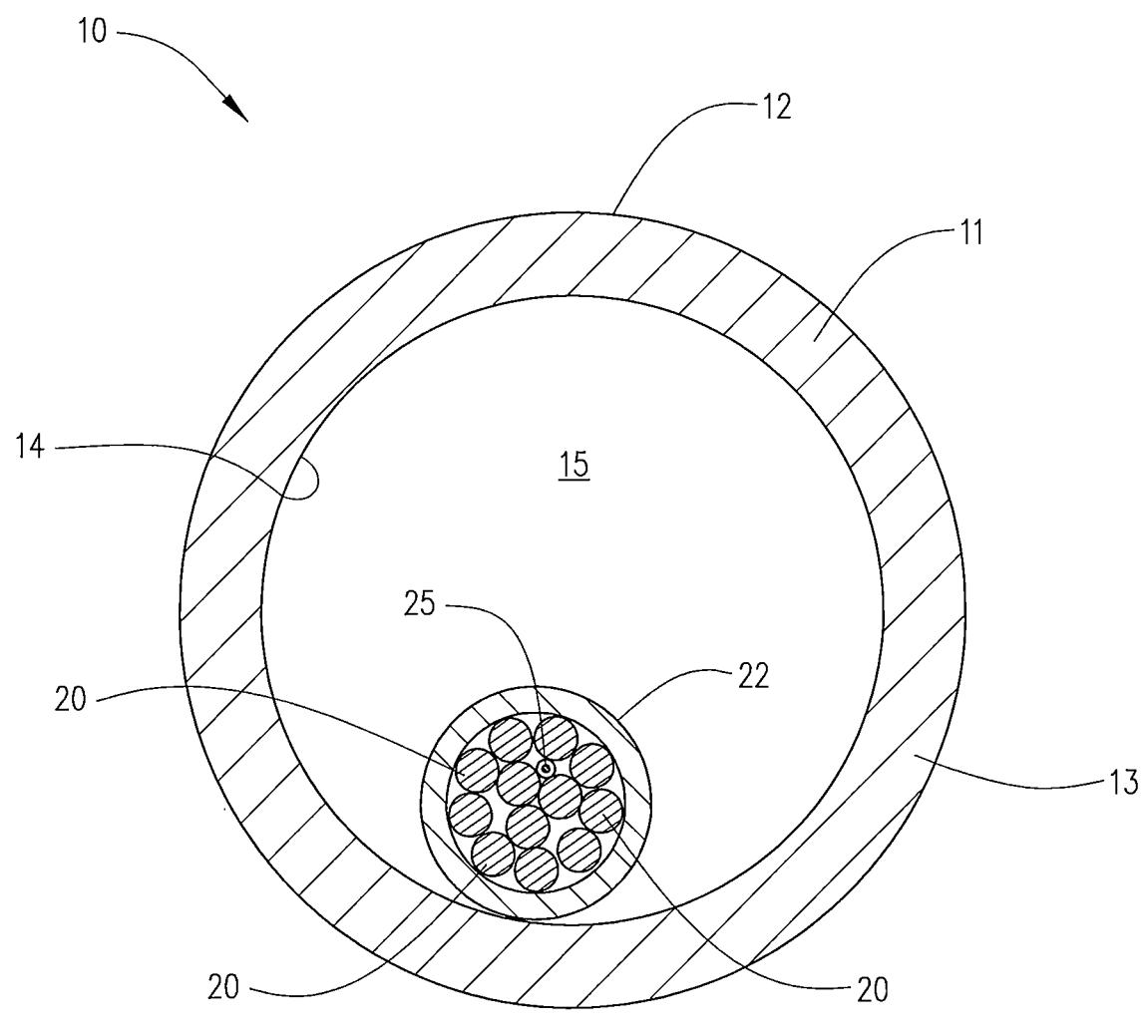
FIG. 7 is a cross section of the high voltage electrical supply cable of FIG. 3.

More specifically the CALM Buoy Electrical Transfer System, as disclosed in FIGS. 1-8 of the drawings, provides the high-voltage electrical power supply line 10 as a high voltage electrical cable 20 within an outer floating hose 11 having a water-proof outer surface 12, a floating core 13 and an inner surface 14 defining a linear cavity 15, and one or more inner high voltage electrical cables 20 encased within an outer insulating sleeve 22 and an inner control wire 25 comprising one or more conductive metal wires or a plurality of wound cable wires, FIG. 7. The outer floating hose 11 provides the high voltage electrical cable 20 with sufficient buoyancy to float near or upon the surface of the water between the LNG vessel C and the SPM CALM buoy A when engaged and securely connected once the LNG vessel C is moored to the SPM CALM buoy A by one or more flexible mooring lines or ropes B, FIGS. 1, and 8. In FIG. 1, both the mooring lines B and the high voltage electrical cable 20 show a connection at the bow of two LNG vessels C, with a small LNG transport vessel C moored alongside the central LNG vessel C. In this depiction of the first embodiment, these moored ships can share power and exchange cargo, including unprocessed or processed LNG, or even share a single high voltage electrical cable using a daisy chain connection between vessels.

It is also further disclosed in FIGS. 3, 5A, 5B and 6, the connections of the high voltage electrical cable 20 attaching to an explosion-proof junction box 40 dispatching and receiving the high voltage electrical current between the supply explosion-proof junction box 40 and the LNG vessel explosion-proof junction box 40. The connection between the high voltage electrical cable 20 and each junction box should be a "robust" connection, defining the term "robust" as a requisite voltage and current range specified previously in the high-voltage and current ranges of electrical supply of 1-16 MW of electrical power with a voltage between 3 kV and 33 kV, with 400 volts or less being impractical to transfer enough power over the distance contemplated through the SPM CALM buoy to LNG vessel electrical connection due to voltage drop over such distance through the electrical cable connection.

Figure 3:
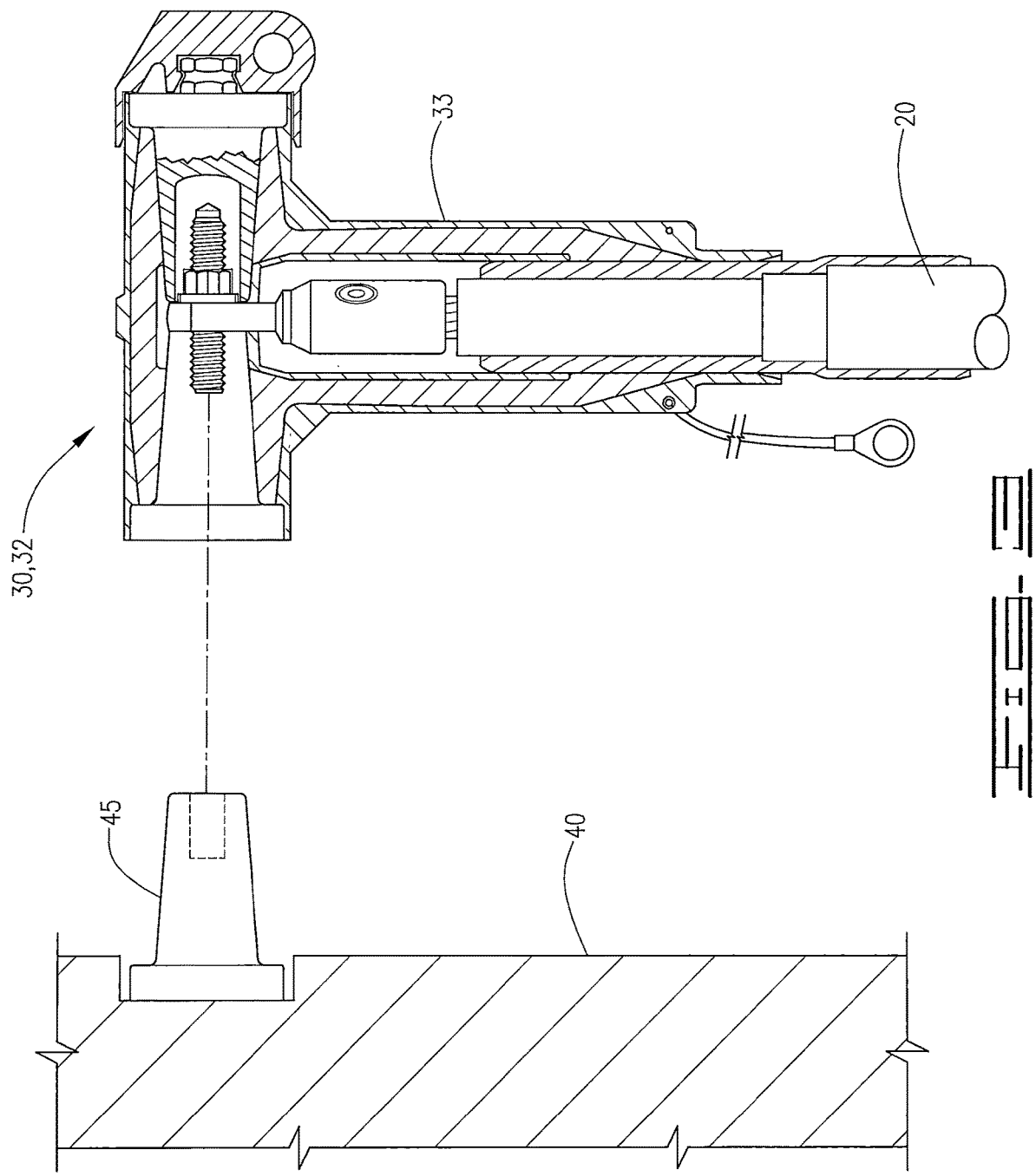
FIG. 3 is a side view of an embodiment of one or more high voltage electrical cables within a floating hose, which places the electric cable against the inside diameter hose carcass of the floating hose, with respective electric cable penetration pieces to prevent water ingress into the floating hose, with solid lines representing the floating hose and the broken lines representing the electric cable, aligned to attached between the electrical supply source connector and the vessel utility connector, showing high voltage T connectors attaching to respective explosion-proof penetration glands at respective explosion-proof junction boxes.
Figure 5B:
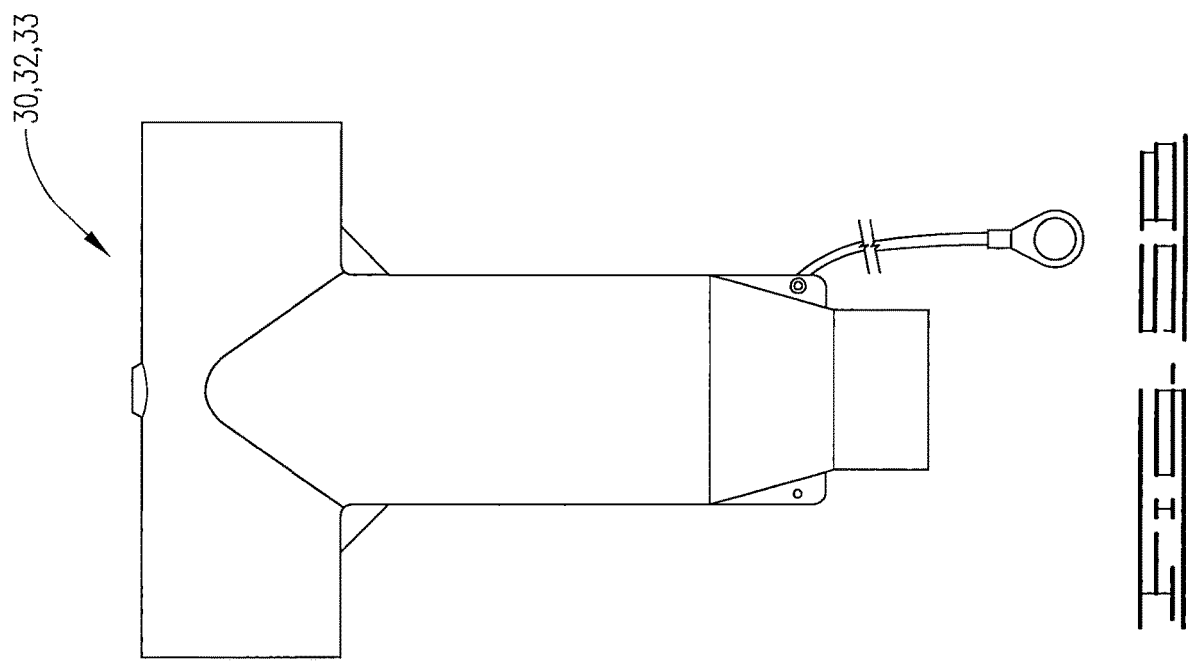
FIG. 5B is an example of an embodiment of an explosion-proof connector gland which would be contained within an explosion-proof junction box mating with the T connector of FIG. 5A.
Figure 5A:
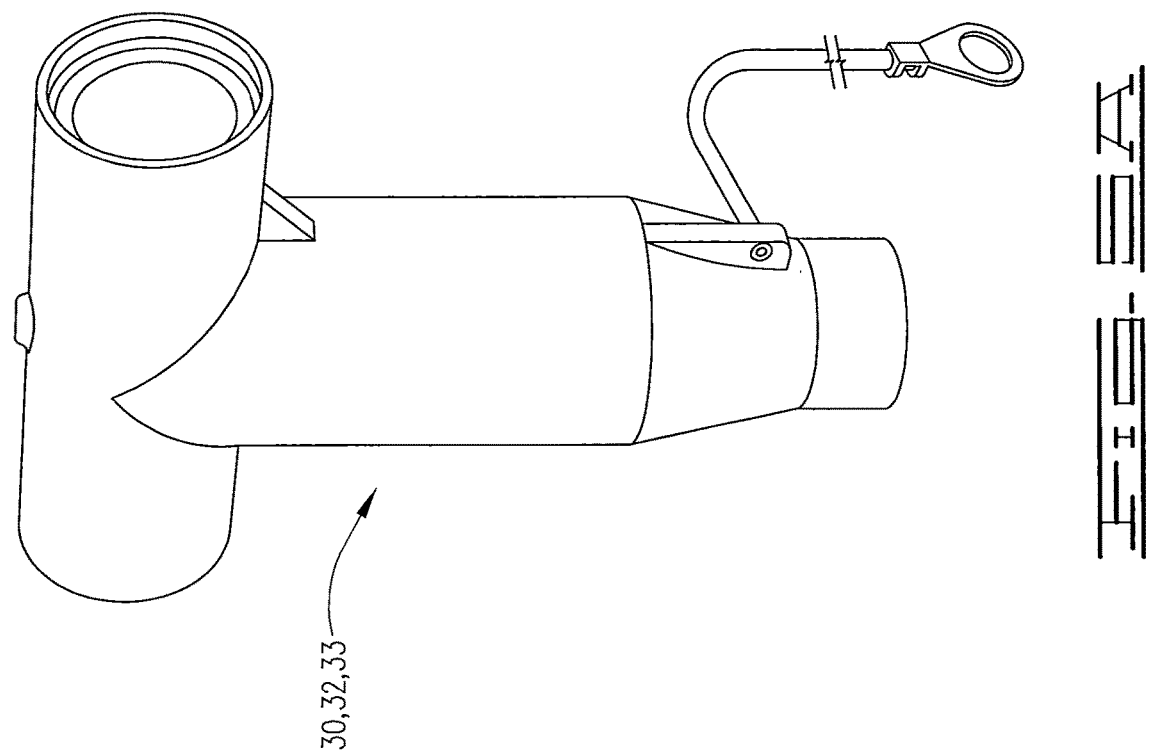
FIG. 5A is an example of an embodiment of a T connector on the high voltage electrical cable.
Figure 5:
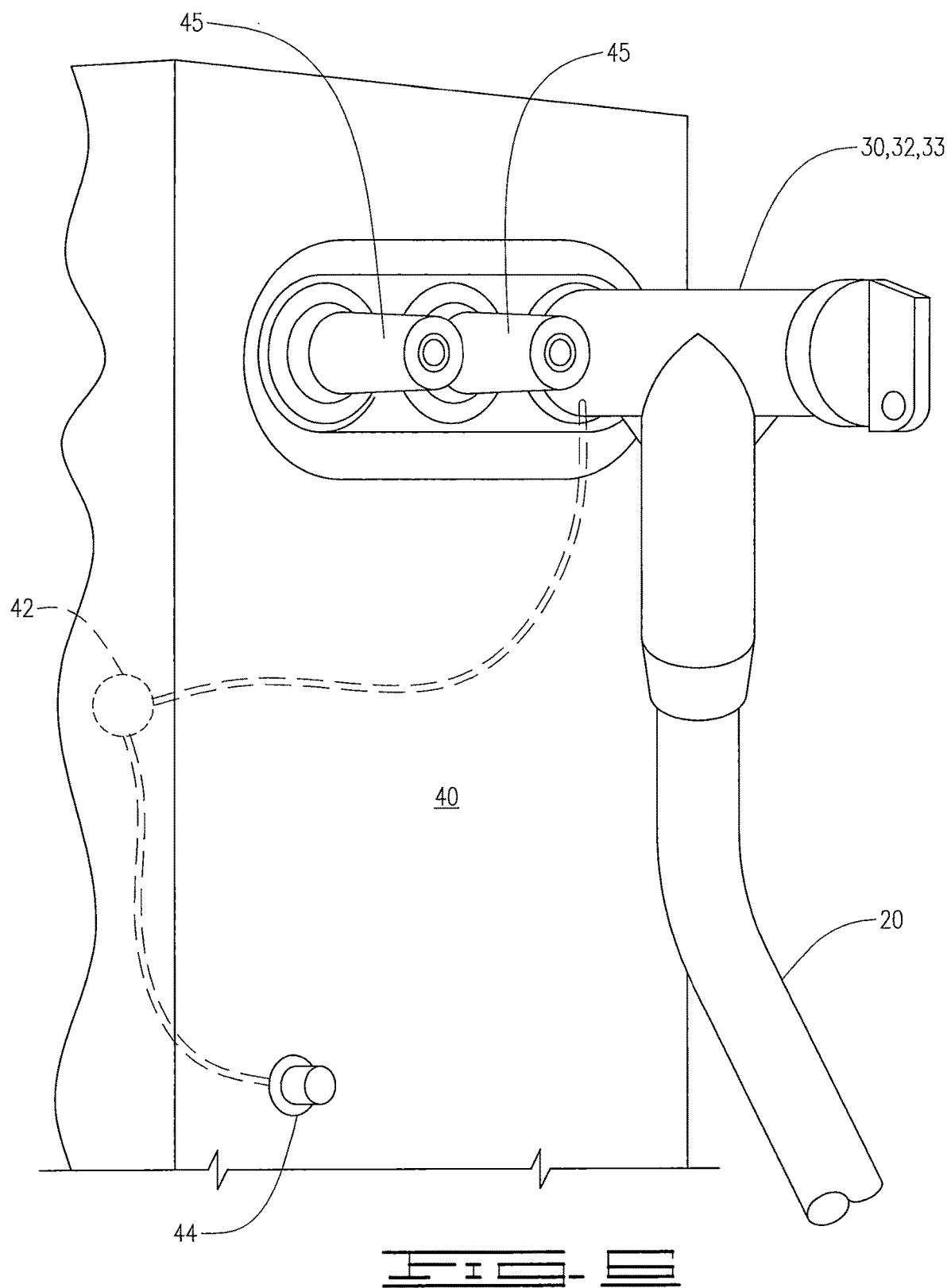

FIGS. 3, 5A and 5B are provided to show an example of an electrical connection known in the art as a robust electrical connection as known in the prior art, using a best operational connection mode comprising a T connector 33 and an explosion proof penetration gland 45 installed within each junction box 40 which can be used in the connection of the high voltage electrical cable 20 and the respective junction boxes 40. The supply end junction box connector 30 and the vessel electrical end connectors 32 are preferably common standards in the marine and offshore industry, so the best practice would be to provide the high voltage electrical cable connecters 30, 32, in industrial standard embodiments suitable for the LNG vessel C and junction box 40 connections to make the high-voltage electrical power supply line 10 practical and useful. FIG. 6 is intended to demonstrate a plurality of connections of high voltage electrical cables to an explosion-proof junction box 40 on either the SPM CALM buoy A and/or the LNG vessel C or both.

The explosion-proof junction box 40 also may provide a junction box sensor 42 attached to the inner control wire 25 within the high-voltage electrical cable 20 with a reset button 44 connected to the junction box sensor 42 and/or each installed explosion-proof penetration gland 45 to withhold electrical transfer if the explosion proof junction box 40 is either not securely attached to the high-voltage electrical cable 20 at either end or the junction box 40 is not fully closed as it should be during use. This junction box sensor 42, inner control wire 25 and reset button 44 shutting off power when a dangerous connection or inappropriate activation are present are intended to avoid personal injury to a person monitoring or establishing the connection of the high-voltage electrical current.

Figure 2:
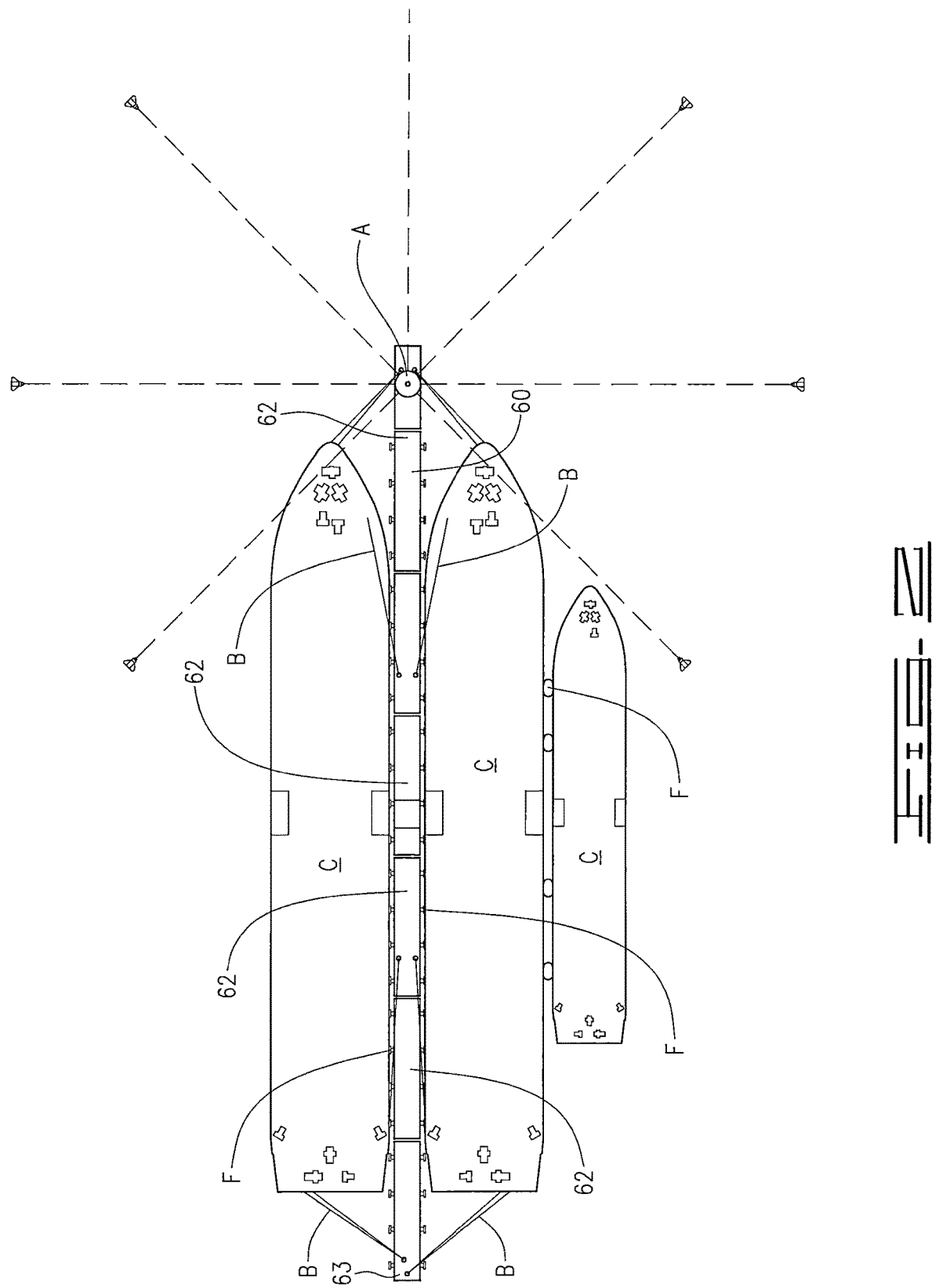
FIG. 2 is a top view of a second embodiment calm buoy plurality of hinge-connected buoyant pontoons which encase the high-voltage electrical power supply cable, each buoyant pontoon extending a plurality of swivel terminals for connection to one or more LNG vessels to independently supply each vessel with a continuous electrical power supply to process and maintain its liquid natural gas contents while anchored and secured to the hinge-connected buoyant pontoons including a lateral tunnel thruster located within the tailing buoyant pontoon for stabilizing the positioning and alignment of the pontoons and moored vessels.
Figure 4:
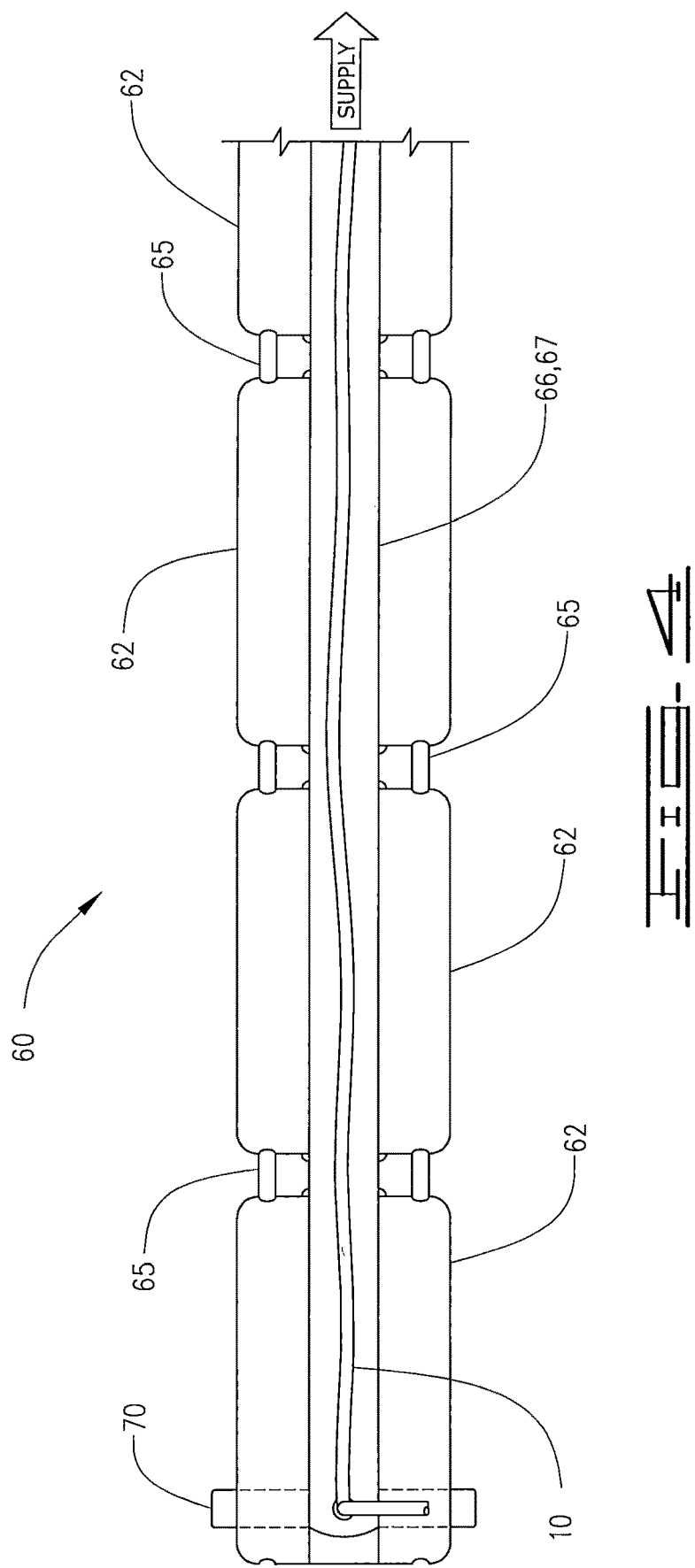
FIG. 4 is a drawing of the buoyant segments of the second embodiment shown in FIG. 2, demonstrating the orientation of the high-voltage electrical power supply upon the series of buoyant segments within a linear cable trough with the lateral tunnel thruster and a plurality of swivel connectors.

Moving to the second embodiment as disclosed in FIGS. 2, 4, a series of attached buoyant pontoons 62 are linearly attached by a respective pair of hinges 65, allowing for up-and-down movement fluctuating with the tides and wave movements under the floating jetty 60, but prohibiting lateral movement, presenting the attached buoyant pontoons 62 in alignment. As shown in FIG. 2, LNG vessels C is moored using multiple flexible mooring lines B secured between the attached buoyant pontoons 62 and an adjacent LNG vessel C, separated by multiple vessel bumpers F, commonly used in the industry. In this second embodiment, because of the proximity of the attached buoyant pontoons 62 and the LNG vessels C, the electrical supply cable can be threaded through the aligned buoyant pontoons through a common central bore when passing through the floating jetty 60 prior to being installed within the LNG vessel C. This is also illustrated in FIG. 4 without the LNG vessel shown. As previously indicated, a lateral tunnel thruster 70 can be provided in the terminal buoyant pontoon 63, FIGS. 2 and 4, which is intended to potentially move the entire aligned floating jetty in an arc around the SPM CALM buoy A to counter lateral and rotational movement of the moored LNG vessel C which is caused by current or wave movement and even the wake of a passing vessel. As shown in FIG. 2, this aligned buoy pontoon and floating jetty 60 embodiment may be used for long-term attachment in the event the LNG vessel C is being used for processing of LNG and subsequent uploading or offloading of LNG from other vessels, which is illustrated by the smaller transport ship in FIG. 2.

Each buoyant pontoon 62 is alternatively provided with a longitudinally aligned cable trough 67 which secures the high-voltage electrical power supply line 10 until termination within the terminal buoyant pontoon 63 or other independent pontoon 62, as shown if FIG. 4. It is preferred that the terminal buoyant pontoon 63 extend beyond the moored LNG vessels C in order for the lateral tunnel thruster 70 to maintain position of the aligned floating jetty 60 as opposed to attempting to negotiate position against the moored LNG vessel C hull, which could cause damage not only to the lateral tunnel thruster 70, but also the LNG vessel C hull. It is contemplated that the aligned floating jetty 60 may also provide a walkway upon which workers may walk above the water levels to maneuver and connect the high voltage electrical supply line 10 to the LNG vessel C, perform maintenance tasks on the LNG vessel hulls, to maintain the aligned buoyant pontoons 62 or other contemplated tasks necessary for long term mooring and LNG vessel processing tasks.

While the high-voltage electrical cable 20 for connection of an LNG vessel C and a SPM CALM buoy A has been particularly shown and described with reference to a preferred embodiment thereof, it will be understood by those skilled in the art that changes in form and detail may be made therein without departing from the spirit and scope of the invention.

What is claimed is:

1. A high-voltage electrical power supply line extending from a SPM CALM buoy for attachment to an LNG vessel providing a high-voltage electrical supply to said LNG, comprising:
   a floating hose defining an outer water proof surface and an inner surface encasing a floating core, said inner surface forming a linear cavity;
   a high-voltage electrical cable having one or more wires within an outer insulating sleeve within said linear cavity, said high-voltage electrical cable further defining a supply end junction box connector and a vessel electrical end connector attaching to a junction box in said LNG vessel and said SPM CALM buoy;
   an inner conducting wire in communication between said supply end junction box connector and said vessel electrical end connector to establish a secure connection prior to energizing said high voltage electrical cable; and
   said SPM CALM buoy attached to a land based power supply through a supply source buoy cable, wherein said LNG vessel moored to said SPM CALM buoy by one or more flexible mooring lines is provided the mobility to leave an installation while moored and receiving electrical power through said high-voltage electrical power supply line from said SPM CALM buoy, enabling said LNG vessel to process LNG onboard said LNG vessel for the purpose or reliquification of boil-off gas and other electrical function, with the capacity to provide electrical power to multiple LNG vessels from said singular SPM CALM buoy.

2. The high-voltage electrical power supply line of claim 1, said supply end junction box connector and a vessel electrical end connector attaching to a junction box involve a high voltage electrical connector and an explosion-proof penetration gland having the capacity to safely communicate an electrical supply of high-voltage and current ranges of electrical supply of 1-16 MW of electrical power with a voltage between 3 kV and 33 kV.

3. The high-voltage electrical power supply line of claim 1, said inner control wire attaching between said explosion-proof junction box located within said SPM CALM buoy and said LNG vessel, further comprising:
   said inner control wire attaching to a junction box sensor on each said explosion-proof junction box and each said supply end junction box connector and a vessel electrical end connector, said inner control wire communicating a secure connection between each said supply end junction box connector and respective junction box on said SPM CALM buoy and said vessel electrical end connector and said junction box on said LNG vessel and preventing electrical transfer where such respective connection is not secured or where said junction box is not secured, avoiding electrical or personal damage and injury to persons or property from explosion, fire or electrocution.

4. A high-voltage electrical power supply line extending from a SPM CALM buoy for attachment to an LNG vessel providing a high-voltage electrical supply to said LNG, comprising:
   a high-voltage electrical cable having one or more wires within an outer insulating sleeve resting within said linear cavity, said high-voltage electrical cable further defining as supply end junction box connector and a vessel electrical end connector attaching to a junction box in said LNG vessel and said SPM CALM buoy;
   an inner conducting wire in communication between said supply end junction box connector and said vessel electrical end connector to establish a secure connection prior to energizing said high-voltage electrical connector;
   a plurality of pontoons forming a floating jetty, said pontoons attached to one another by hinges, each said pontoon high-voltage electrical cable, said floating jetty connected to said SPM CALM buoy; and
   said SPM CALM buoy attached to a land based power supply through a supply source buoy cable, wherein said LNG vessel moored to said SPM CALM buoy by one or more flexible mooring lines is provided the mobility to leave an installation while moored and receiving electrical power through said high-voltage electrical power supply line from said SPM CALM buoy, enabling said LNG vessel to process LNG onboard said LNG vessel for the purpose or reliquification of boil-off gas and other electrical function, with the capacity to provide electrical power to multiple LNG vessels from said singular SPM CALM buoy.

5. The high-voltage electrical power supply line of claim 4, said supply end junction box connector and a vessel electrical end connector attaching to a junction box involve defines a high-voltage connector and an explosion proof penetration gland having the capacity to safely communicate an electrical supply of high-voltage and current ranges of electrical supply of 1-16 MW of electrical power with a voltage between 3 kV and 33 kV.

6. The high-voltage electrical power supply line of claim 4, said inner control wire attaching between said explosion-proof junction box located within said SPM CALM buoy and said LNG vessel, further comprising:
   said inner control wire attaching to a junction box sensor on each said explosion-proof junction box and each said supply end junction box connector and a vessel electrical end connector, said inner control wire communicating a secure connection between each said supply end junction box connector and respective junction box on said SPM CALM buoy and said vessel electrical end connector and said junction box on said LNG vessel and preventing electrical transfer where such respective connection is not secured or where said junction box is not secured, avoiding electrical or personal damage and injury to persons or property from explosion, fire or electrocution.

7. The high-voltage electrical power supply line of claim 4, said floating jetty further defining:
   a terminal pontoon distal within said floating jetty from said SPM CALM buoy containing a lateral tunnel thruster for adjusting said floating jetty in a desired radial position around said SPM CALM buoy for adjustment and positioning of one or more said LNG vessels moored to said floating jetty and connected to said high-voltage electrical power supply line.

8. A high-voltage electrical power supply line extending from a SPM CALM buoy for attachment to an LNG vessel providing a high-voltage electrical supply to said LNG, comprising:
   a high-voltage electrical cable having one or more wires within an outer insulating sleeve resting within said linear cavity, said high-voltage electrical cable further defining as supply end junction box connector and a vessel electrical end connector attaching to a junction box in said LNG vessel and said SPM CALM buoy;
   an inner conducting wire in communication between said supply end junction box connector and said vessel electrical end connector to establish a secure connection prior to energizing said high-voltage electrical connector;

a plurality of pontoons forming a floating jetty, said pontoons attached to one another by hinges, each said pontoon defining a longitudinal aligned cable trough securing said high-voltage electrical cable, said floating jetty connected to said SPM CALM buoy; and said SPM CALM buoy attached to a land based power supply through a supply source buoy cable, wherein said LNG vessel moored to said SPM CALM buoy by one or more flexible mooring lines is provided the mobility to leave an installation while moored and receiving electrical power through said high-voltage electrical power supply line from said SPM CALM buoy, enabling said LNG vessel to process LNG onboard said LNG vessel for the purpose or reliquification of boil-off gas and other electrical function, with the capacity to provide electrical power to multiple LNG vessels from said singular SPM CALM buoy.

9. The high-voltage electrical power supply line of claim 8, said supply end junction box connector and a vessel electrical end connector attaching to a junction box involve a high voltage connector and an explosion proof penetration gland having the capacity to safely communicate an electrical supply of high-voltage and current ranges of electrical supply of 1-16 MW of electrical power with a voltage between 3 kV and 33 kV.

10. The high-voltage electrical power supply line of claim 8, said inner control wire attaching between said explosion-proof junction box located within said SPM CALM buoy and said LNG vessel, further comprising:

said inner control wire attaching to a junction box sensor on each said explosion-proof junction box and each said supply end junction box connector and a vessel electrical end connector, said inner control wire communicating a secure connection between each said supply end junction box connector and respective junction box on said SPM CALM buoy and said vessel electrical end connector and said junction box on said LNG vessel and preventing electrical transfer where such respective connection is not secured or where said junction box is not secured, avoiding electrical or personal damage and injury to persons or property from explosion, fire or electrocution.

11. The high-voltage electrical power supply line of claim 8, said floating jetty further defining:

a terminal pontoon distal within said floating jetty from said SPM CALM buoy containing a lateral tunnel thruster for adjusting said floating jetty in a desired radial position around said SPM CALM buoy for adjustment and positioning of one or more said LNG vessels moored to said floating jetty and connected to said high-voltage electrical power supply line.

* * * * *